US012460872B2

(12) United States Patent
Wang et al.

(10) Patent No.: US 12,460,872 B2
(45) Date of Patent: Nov. 4, 2025

(54) HEAT EXCHANGER AND METHOD FOR PROCESSING HEAT EXCHANGER

(71) Applicant: SANHUA (HANGZHOU) MICRO CHANNEL HEAT EXCHANGER CO., LTD., Zhejiang (CN)

(72) Inventors: Feng Wang, Zhejiang (CN); Jianlong Jiang, Zhejiang (CN); Qiang Gao, Zhejiang (CN)

(73) Assignee: SANHUA (HANGZHOU) MICRO CHANNEL HEAT EXCHANGER CO., LTD., Zhejiang (CN)

( * ) Notice: Subject to any disclaimer, the term of this patent is extended or adjusted under 35 U.S.C. 154(b) by 321 days.

(21) Appl. No.: 18/043,149

(22) PCT Filed: Aug. 31, 2020

(86) PCT No.: PCT/CN2020/112685

§ 371 (c)(1),
(2) Date: Feb. 27, 2023

(87) PCT Pub. No.: WO2022/041250

PCT Pub. Date: Mar. 3, 2022

(65) Prior Publication Data

US 2023/0314085 A1 Oct. 5, 2023

(51) Int. Cl.
*F28D 7/16* (2006.01)
*B23P 15/26* (2006.01)
*F28F 9/02* (2006.01)

(52) U.S. Cl.
CPC .............. *F28D 7/163* (2013.01); *B23P 15/26* (2013.01); *F28F 9/02* (2013.01)

(58) Field of Classification Search
CPC ........ B21D 53/085; B21D 11/00; B21D 5/01; F28D 7/163; F28D 1/0471; F28F 1/126; F28F 9/02; F28F 1/022; F25B 39/02
See application file for complete search history.

(56) References Cited

U.S. PATENT DOCUMENTS

2012/0279689 A1* 11/2012 Wang ...................... F28D 1/047 165/144
2017/0343288 A1 11/2017 Joardar
(Continued)

FOREIGN PATENT DOCUMENTS

CN 201731683 U 2/2011
CN 203274364 U 11/2013
(Continued)

OTHER PUBLICATIONS

Pdf is translation of foreign reference CN 105651081 A (Year: 2016).*
(Continued)

*Primary Examiner* — Len Tran
*Assistant Examiner* — Kamran Tavakoldavani
(74) *Attorney, Agent, or Firm* — David D. Brush; Westman, Champlin & Koehler, P.A.

(57) ABSTRACT

A heat exchanger includes a heat exchange tube including a bent section, and first and second sections. The bent section includes a section to be bent before bending, and the section to be bent includes a protruding section. A plane parallel to a length direction of a first header and parallel to a length direction of the first section, and also perpendicular to a width direction of the first section is a first plane before the bent section is bent. In the first plane, a minimum distance from a projection line of a first side edge of the protruding section to a projection line of a first side edge of the first section is H, and a minimum distance from the projection line of the first side edge of the first section to the projection line of the first side edge of another adjacent first section is L, and H≥L.

17 Claims, 9 Drawing Sheets

(56) References Cited

U.S. PATENT DOCUMENTS

| | | | | |
|---|---|---|---|---|
| 2018/0142957 | A1* | 5/2018 | Laurentius | F25B 39/02 |
| 2018/0244127 | A1* | 8/2018 | Sennoun | F28F 7/02 |

FOREIGN PATENT DOCUMENTS

| | | | | | |
|---|---|---|---|---|---|
| CN | 203286911 | U | | 11/2013 | |
| CN | 105651081 | A | * | 6/2016 | B21D 53/085 |
| CN | 109269341 | A | | 1/2019 | |
| JP | 2010169289 | A | | 8/2010 | |
| WO | 2015037235 | A1 | | 3/2015 | |

OTHER PUBLICATIONS

International Search Report dated May 21, 2021 for corresponding International Application No. PCT/CN2020/112685, filed Aug. 31, 2020.

Written Opinion of the International Searching Authority dated May 21, 2021 for corresponding International Application No. PCT/CN2020/112685, filed Aug. 31, 2020.

English translation of the Written Opinion of the International Searching Authority dated May 21, 2021 for corresponding International Application No. PCT/CN2020/112685, filed Aug. 31, 2020.

* cited by examiner

HEAT EXCHANGER AND METHOD FOR PROCESSING HEAT EXCHANGER

CROSS-REFERENCE TO RELATED APPLICATION

The present application is a U.S. National Stage of International Application No. PCT/CN2020/112685, filed on Aug. 31, 2020, and published as WO 2022/041250 on Mar. 3, 2022, not in English, the contents of all of which are incorporated herein by reference in their entireties for all purposes.

TECHNICAL FIELD

Embodiments of the present disclosure relate to a field of air conditioning heat exchange, and more particularly, to a heat exchanger and a method for processing a heat exchanger.

BACKGROUND

At present, a multi-channel heat exchanger is widely used in the field of air conditioning and refrigeration. In the related art, the multi-channel heat exchanger includes a plurality of heat exchange tubes, the plurality of heat exchange tubes include a bent section, and no fin is arranged in the bent section. In the bent section, parts of adjacent bent sections are overlapped with each other in a thickness direction of the heat exchange tube. After the heat exchanger is mounted and used, the overlapped parts of the tubes tend to accumulate water and dust. In addition, in the bending process during the manufacturing or mounting of the heat exchanger, the overlapped parts of the adjacent heat exchange tubes may rub against each other, thus reducing the reliability of the heat exchange tubes.

SUMMARY

A heat exchanger according to the embodiments of a first aspect of the present disclosure includes: a first header and a second header; and a plurality of heat exchange tubes spaced apart along a length direction of the first header, the heat exchange tube communicating the first header with the second header, the heat exchange tube being flat, the heat exchange tube including a first face and a second face arranged along a thickness direction of the heat exchange tube, the heat exchange tube including a third face and a fourth face arranged along a width direction of the heat exchange tube, an intersection portion of the first face and the third face being a first side edge, the heat exchange tube including a first section, a bent section and a second section, a first end of the first section of the heat exchange tube being connected to a first end of the bent section, a second end of the first section being in communication with the first header, a first end of the second section of the heat exchange tube being connected to a second end of the bent section, a second end of the second section being in communication with the second header, a length direction of the first section and a length direction of the second section define an included angle therebetween, and adjacent bent sections in a thickness direction of the bent section being spaced apart. The bent section of the heat exchanger includes a section to be bent before bending, the section to be bent includes a protruding section and at least two transition sections, a first end of the protruding section is connected to a first end of one transition section, a second end of the one transition section is connected to the first end of the first section, a second end of the protruding section is connected to a first end of another transition section, and a second end of the other transition section is connected to the first end of the second section. A plane parallel to the length direction of the first header and parallel to the length direction of the first section, and also perpendicular to a width direction of the first section is defined as a first plane before the bent section is bent. In the first plane, a projection line of a first side edge of the protruding section of the heat exchange tube is not collinear with a projection line of a first side edge of the first section of the heat exchange tube, a minimum distance from the projection line of the first side edge of the protruding section of the heat exchange tube to the projection line of the first side edge of the first section of the heat exchange tube is H, and a minimum distance from the projection line of the first side edge of the first section of the heat exchange tube to the projection line of the first side edge of the first section of another adjacent heat exchange tube in the length direction of the first header is L, and H is greater than or equal to L.

A method for processing a heat exchanger according to the embodiments of a second aspect of the present disclosure includes: preparing a heat exchanger to be processed, in which the heat exchanger to be processed includes a first header, a second header, and a plurality of heat exchange tubes, the plurality of the heat exchange tubes are spaced apart along a length direction of the first header, the heat exchange tube communicates the first header with the second header, the heat exchange tube includes a first face and a second face arranged in parallel in the length direction of the first header, the heat exchange tube includes a first section, a section to be bent and a second section, a first end of the first section is connected to a first end of the section to be bent, a second end of the first section is in communication with the first header, a first end of the second section is connected to a second end of the section to be bent, and a second end of the second section is in communication with the second header; translating a part of the section to be bent of the heat exchange tube by a preset distance relative to the first section and the second section of the heat exchange tube along the length direction of the first header, so that the translated part of the section to be bent deviates from the first section of the heat exchange tube in the length direction of the first header; moving the first header towards the second header, and moving the second header towards the first header; and bending the section to be bent of the heat exchange tube in the length direction while reducing an included angle between the first section and the second section of the heat exchange tube to a predetermined angle, after translating the part of the section to be bent by the preset distance.

A method for processing a heat exchanger according to the embodiments of a third aspect of the present disclosure includes: translating a sections of a heat exchange tube by a preset distance relative to a first end and a second end of the heat exchange tube along a thickness direction of the heat exchange tube, so that the translated sections of the heat exchange tube protrude from the first end and the second end of the heat exchange tube in the thickness direction of the heat exchange tube; arranging and spacing apart a plurality of the heat exchange tubes along the thickness direction of the heat exchange tube, in which directions, in which the sections of the plurality of the heat exchange tubes protrude from their first ends and their second end in a thickness direction of the heat exchange tube, are identical; and fixedly connecting first ends of the plurality of the heat exchange tubes with a first header and fixedly connecting second ends of the plurality of the heat exchange tubes with a second header, in which the protruding sections of the plurality of the heat exchange tubes are aligned in a length direction of the first header.

DETAILED DESCRIPTION

Figure 1:
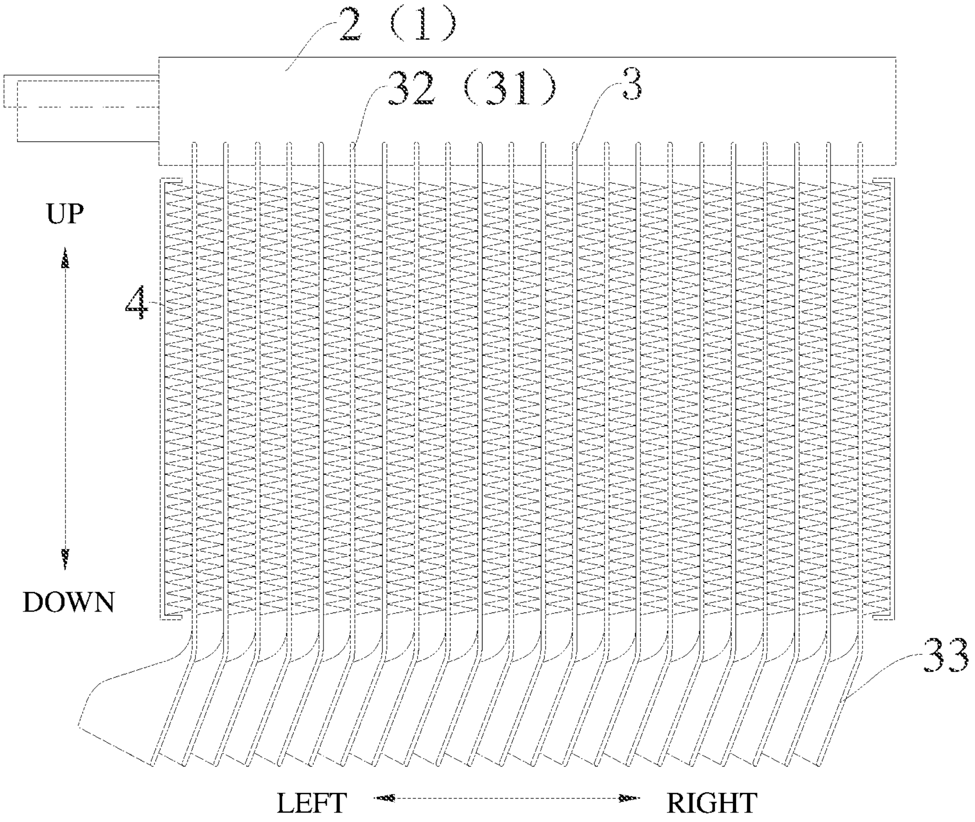
FIG. 1 is a front view of a heat exchanger according to an embodiment of the present disclosure.

Embodiments of the present disclosure are described in detail below, and examples of the embodiments are shown in accompanying drawings. The following embodiments described with reference to the accompanying drawings are exemplary and are only intended to explain the present disclosure, rather than limit the present disclosure. In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation and position as then described or as shown in the drawings under discussion. These relative terms are only for convenience of description and do not indicate or imply that the device or element referred to must have a particular orientation, or be constructed and operated in a particular orientation. Thus, these terms shall not be construed as limitation on the present disclosure.

As shown in FIGS. 1 to 8, a heat exchanger according to embodiments of the present disclosure includes a first header 1, a second header 2, a plurality of heat exchange tubes 3 and a fin 4.

Specifically, as shown in FIG. 1, the first header 1 and the second header 2 are juxtaposed (i.e., arranged side by side), and a length of the first header 1 is the same with a length of the second header 2.

Figure 2:
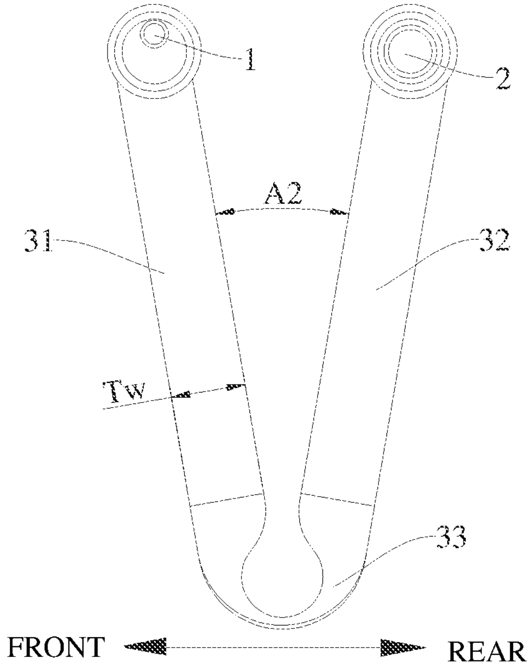
FIG. 2 is a side view of a heat exchanger according to an embodiment of the present disclosure.
Figure 3:
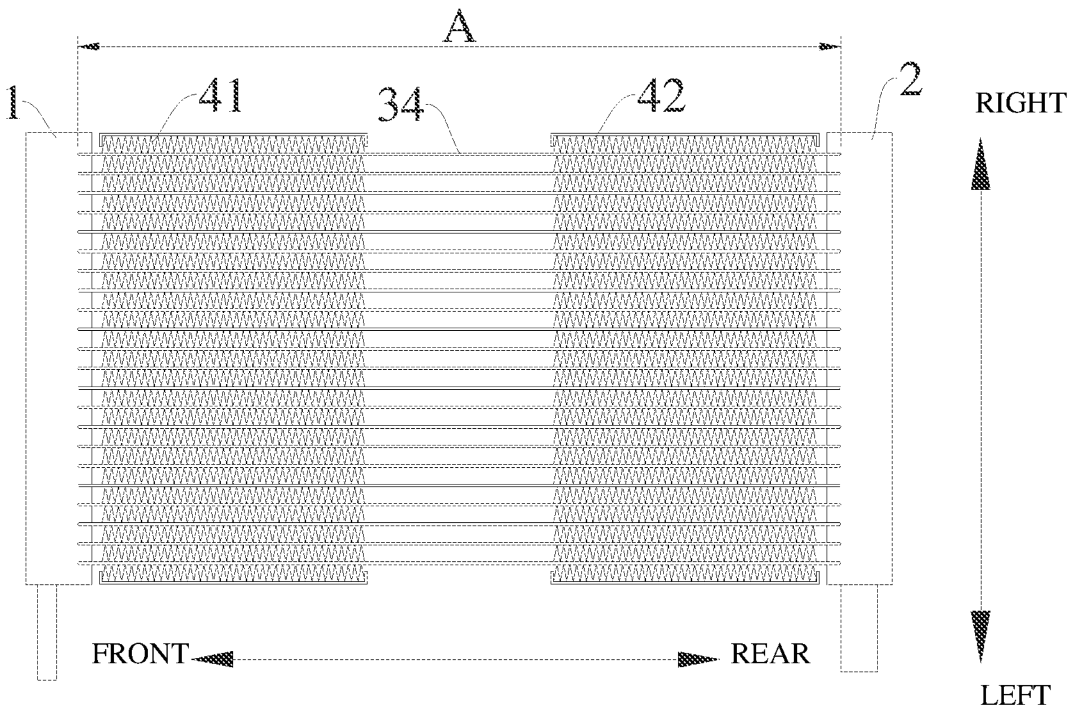
FIG. 3 is a schematic view of a heat exchanger before a section to be bent is translated according to an embodiment of the present disclosure.
Figure 4:
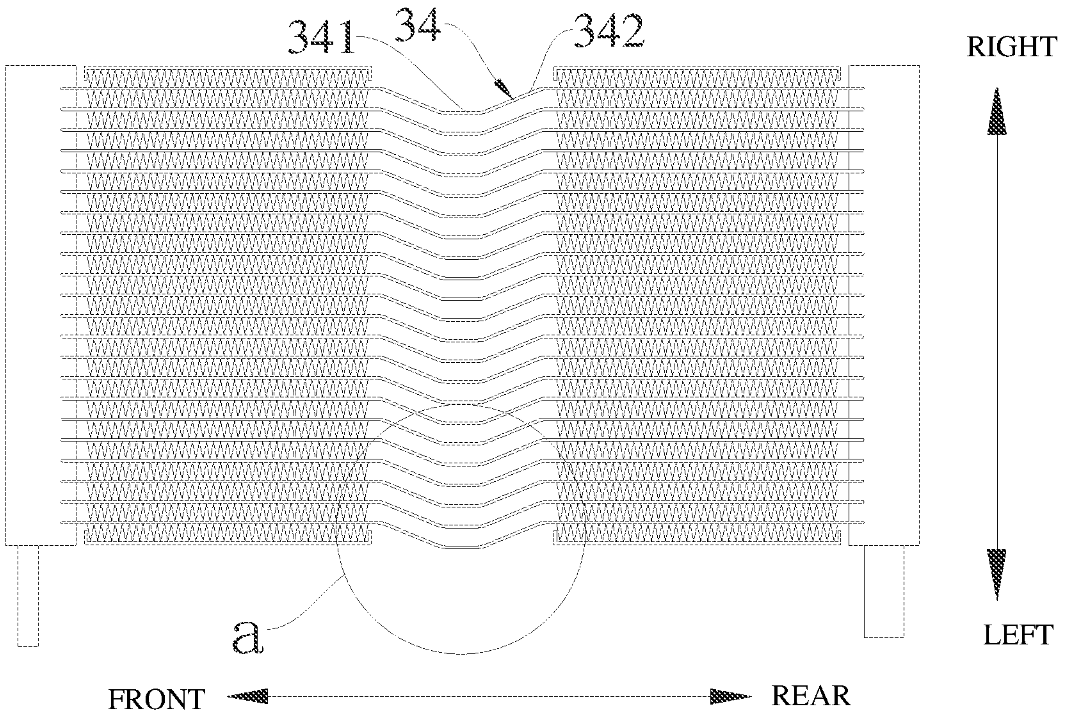
FIG. 4 is a schematic view of a heat exchanger after a section to be bent is translated according to an embodiment of the present disclosure.

The plurality of heat exchange tubes 3 are spaced apart along a length direction of the first header 1 (a left-right direction as shown in FIG. 1). The heat exchange tube 3 communicates the first header 1 with the second header 2, and the heat exchange tube 3 is flat. The heat exchange tube 3 includes a first face (a left side face of the heat exchange tube 3 in FIG. 1) and a second face (a right side face of the heat exchange tube 3 in FIG. 1) arranged along a thickness direction (the left-right direction as shown in FIG. 1) of the heat exchange tube 3. The heat exchange tube 3 includes a third face (a front side face of the heat exchange tube 3 in FIG. 2) and a fourth face (a rear side face of the heat exchange tube 3 in FIG. 2) arranged along a width direction (a front-rear direction as shown in FIG. 2) of the heat exchange tube 3. An intersection portion of the first face and the third face is a first side edge. Referring to schematic views, in which the heat exchange tube 3 in the heat exchanger is not bent, as shown in FIGS. 3 and 4, a front end of the heat exchange tube 3 is in communication with the first header 1, and a rear end of the heat exchange tube 3 is in communication with the second header 2.

The heat exchange tube 3 includes the first face (a left side face of the heat exchange tube 3 in FIG. 1) and the second face (a right side face of the heat exchange tube 3 in FIG. 1) arranged in parallel in the length direction of the first header 1. Referring to schematic views, in which the heat exchange tube 3 in the heat exchanger is not bent, as shown in FIGS. 3 to 9, the heat exchange tube 3 is generally flat, the heat exchange tube 3 has a length extending in the front-rear direction, a thickness extending in the left-right direction, and a width extending perpendicularly to the page of FIG. 3, and the following relation is satisfied: the length of the heat exchange tube 3>the width of the heat exchange tube 3>the thickness of the heat exchange tube 3.

The heat exchange tube 3 includes a first section 31, a bent section 33, and a second section 32. A first end of the first section 31 (a lower end of the first section 31 in FIG. 1) of the heat exchange tube 3 is connected to a first end of the bent section 33, and a second end of the first section 31 (an upper end of the first section 31 in FIG. 1) is in communication with the first header 1. A first end of the second section 32 (a lower end of the second section 32 in FIG. 1) of the heat exchange tube 3 is connected to a second end of the bent section 33, and a second end of the second section 32 (an upper end of the second section 32 in FIG. 1) is in communication with the second header 2. As shown in FIG. 2, a length direction of the first section 31 and a length direction of the second section 32 define an included angle therebetween, and adjacent bent sections 33 are spaced apart in a thickness direction of the bent section 33.

The fin 4 includes a first fin 41 and a second fin 42. The first fin 41 is arranged between adjacent first sections 31 in the length direction of the first header 1, the second fin 42 is arranged between adjacent second sections 32 in the length direction of the first header 1, and no fin is arranged between adjacent bent sections 33 in the length direction of the first header 1 (here, the length direction of the first header 1 is the same with the thickness direction of the heat exchange tube).

Referring to a schematic view, in which the heat exchange tube 3 in the heat exchanger is not bent, as shown in FIG. 4, the bent section 33 of the heat exchanger includes a section 34 to be bent before bending, and the section 34 to be bent includes a protruding section 341 and at least two transition sections 342. A first end of the protruding section 341 (a front end of the protruding section 341 in FIG. 4) is connected to a first end of one transition section 342 (a rear end of the first transition section 342 in FIG. 4), and a second end of the one transition section 342 (a front end of the first transition section 342 in FIG. 4) is connected to the first end of the first section 31 (a rear end of the first section 31 in FIG. 4). A second end of the protruding section 341 (a rear end of the protruding section 341 in FIG. 4) is connected to a first end of another transition section 342 (a front end of the second transition section 342 in FIG. 4), and a second end of the other transition section 342 (a rear end of the second transition section 342 in FIG. 4) is connected to the first end of the second section 32 (a front end of the second section 32 in FIG. 4).

A plane parallel to the length direction of the first header 1 and parallel to the length direction of the first section 31, and also perpendicular to a width direction of the first section 31 (a direction perpendicular to the page of FIG. 4) is defined as a first plane (a plane parallel to the page of FIG. 4) before the bent section 33 is bent.

In the first plane, a projection line of a first side edge of the protruding section 341 (a left side edge of the protruding section 341 in FIG. 4) of the heat exchange tube 3 is not collinear with a projection line of a first side edge of the first section 31 (a left side edge of the first section 31 in FIG. 4) of the heat exchange tube 3. A minimum distance from the projection line of the first side edge of the protruding section 341 of the heat exchange tube 3 to the projection line of the first side edge of the first section 31 of the first heat exchange tube 3 is H, a minimum distance from the projection line of the first side edge of the first section 31 of the heat exchange tube 3 to the projection line of the first side edge of the first section 31 of another adjacent heat exchange tube 3 in the length direction of the first header 1 is L, and H is greater than or equal to L.

In the heat exchanger according to the embodiments of the present disclosure, the first fin is arranged between the first sections of adjacent heat exchange tubes and the second fin is arranged between the second sections of adjacent heat exchange tubes, so that the plurality of heat exchange tubes are juxtaposed at a same interval along the length direction of the first header and are in communication with the first header and the second header. A spacing between adjacent heat exchange tubes is L. The bent section of the heat exchange tube is translated by a distance of H along the length direction of the first header before bending, H is greater than or equal to L, and then the heat exchange tube is bent.

In the heat exchanger, the section to be bent is designed to include the protruding section before bending, and a protrusion distance of the protruding section is greater than a spacing of adjacent first sections, so that the bent sections of the adjacent heat exchange tubes are spaced apart after bending, and the adjacent bent sections are not in contact with each other, thus reducing the risk of mutual friction between the adjacent bent sections during bending, and improving the reliability of the heat exchange tube.

In some applications, a surface of the heat exchange tube has a material layer containing zinc, so as to increase the corrosion resistance of the heat exchange tube. Moreover, the bent sections are spaced apart, so that the risk of damaging the zinc layer caused by mutual friction between surfaces of the adjacent bent sections during bending is reduced. During the use of the heat exchanger, a sufficient gap is defined between the bent sections of the heat exchange tubes, and no overlapping section exists, thus reducing the accumulation of moisture and dust on the bent section and decreasing the corrosion risk of the bent sections. No fin is arranged at the bent section, and hence the bent section is an area with weak corrosion resistance compared with the first section and the second section. Therefore, reducing the risk of corrosion of the bent section is conducive to the improvement of the overall reliability and the service life of the heat exchanger.

In some applications, the surface of the heat exchanger needs to be processed (electroplated or sprayed) to be covered with an anti-corrosion coating. The bent section may be completely covered with anti-corrosion coating materials, so as to improve the corrosion resistance of the heat exchanger.

Figure 5:
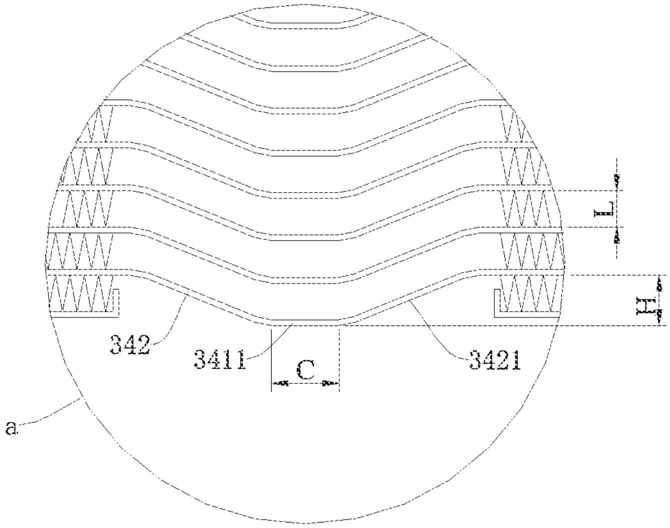
FIG. 5 is an enlarged schematic view of part a in FIG. 4.

In some embodiments, as shown in FIGS. 2 and 5, H is less than 5 times Tw, in which Tw is the width of the heat exchange tube 3. It can be understood that the translation distance H of the section 34 to be bent in the heat exchange tube 3 is related to the width of the heat exchange tube 3 itself. The wider the width of the heat exchange tube 3 is, the greater the translation distance needed by the section 34 to be bent is, but the translation distance of the section 34 to be bent has a negative impact on the overall heat exchange efficiency of the heat exchanger. Therefore, the following relation is satisfied: H<5 Tw.

In some embodiments, as shown in FIG. 5, H is greater than or equal to 1.5 times L. Therefore, after the heat exchange tube 3 is bent, the first section 31 and the second section 32 extend in an up-down direction, and the bent section 33 extends from up to down and is inclined leftwards. Therefore, adjacent bent sections 33 in the left-right direction after bending are spaced apart, thus improving the reliability of the heat exchange tube 3.

In some embodiments, the protruding section 341 includes a first straight section 3411 at least in part before the bent section 33 is bent. That is, at least a part of the protruding section 341 is configured as the first straight section 3411 before the bent section 33 is bent. Likewise, the expressions including "at least in part" may be interpreted in a similar manner below. A length direction of the first straight section 3411 (the front-rear direction as shown in FIG. 4) is generally parallel to the length direction of the first section 31 (the front-rear direction as shown in FIG. 4), and the plurality of heat exchange tubes 3 have consistent directions from the first faces of their respective first sections 31 to the first faces of their respective first straight section 3411.

Therefore, the bent sections after bending may be inclined in a same direction, and the structural compactness of the heat exchanger can be improved. Of course, in some embodiments, the plurality of heat exchange tubes 3 may have inconsistent directions from the first faces of their respective first sections 31 to the first faces of their respective first straight sections 3411. After bending, the heat exchange tubes are inclined in different directions opposite to each other. The bent sections are spaced apart, so that it is conducive to controlling a size of the bent section in the left-right direction, and the structure of the heat exchanger is compact.

As shown in FIGS. 4 and 5, the first straight section 3411 extends in the front-rear direction, the first section 31 extends in the front-rear direction, and the length direction of the first straight section 3411 is generally parallel to the length direction of the first section 31. In the plurality of heat exchange tubes 3, the plurality of sections 34 to be bent are translated by a same distance in a direction from right to left.

In some embodiments, a length of the first straight section 3411 before bending is C, and the length of the heat exchange tube 3 is A before the bent section 33 of the heat exchange tube 3 is bent, and C is less than or equal to 0.5 times A.

As shown in FIGS. 3 to 5, when the section 34 to be bent in the heat exchange tube 3 is not translated, the heat exchange tube 3 extends straightly in the front-rear direction, and the length of the heat exchange tube 3 is A. After the section 34 to be bent in the heat exchange tube 3 is translated, the length of the first straight section 3411 before bending is C, and C is less than or equal to 0.5 times A. Thus, when the section 34 to be bent is translated, the resistance of the heat exchange tube 3 during displacement can be reduced, thus reducing the stress on the heat exchange tube 3, reducing the influence on a junction between the heat exchange tube 3 and the first header 1 and a junction between the heat exchange tube 3 and the second header 2 respectively, and improving the reliability of the heat exchange tube 3. Also, due to the sufficient gap between the heat exchange tubes at the bent sections, the accumulation of moisture and dust during use is reduced. Further, a top of the bent section brought by the first straight section after bending becomes more flat, which is conducive to the drainage of moisture. In some systems used as an evaporator or a heat pump, water can be prevented or avoided from being blown by the wind, and the service performance can be improved.

Figure 6:
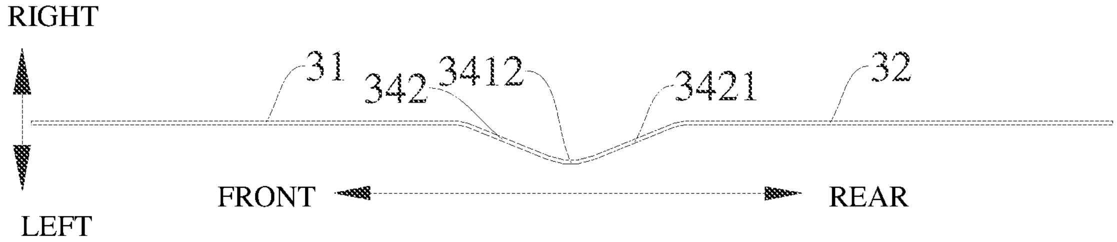
FIG. 6 is a schematic view of a heat exchanger after a section to be bent is translated according to another embodiment of the present disclosure.

In some embodiments, the protruding section 341 includes a first arc-shaped section 3412 at least in part before the bent section 33 is bent, and the plurality of heat exchange tubes 3 have consistent directions from the first faces of their respective first sections 31 to the first faces of their respective first arc-shaped sections 3412. As shown in FIGS. 3 and 6, in the plurality of heat exchange tubes 3, the plurality of sections 34 to be bent are translated by the same distance in the direction from right to left, so that the plurality of heat exchange tubes 3 have the consistent directions from the first faces of their respective first sections 31 to the first faces of their respective first arc-shaped sections 3412.

Figure 7:
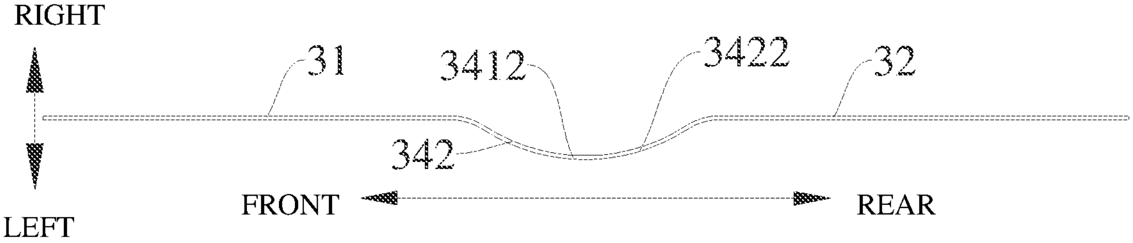
FIG. 7 is a schematic view of a heat exchanger after a section to be bent is translated according to still another embodiment of the present disclosure.
Figure 8:
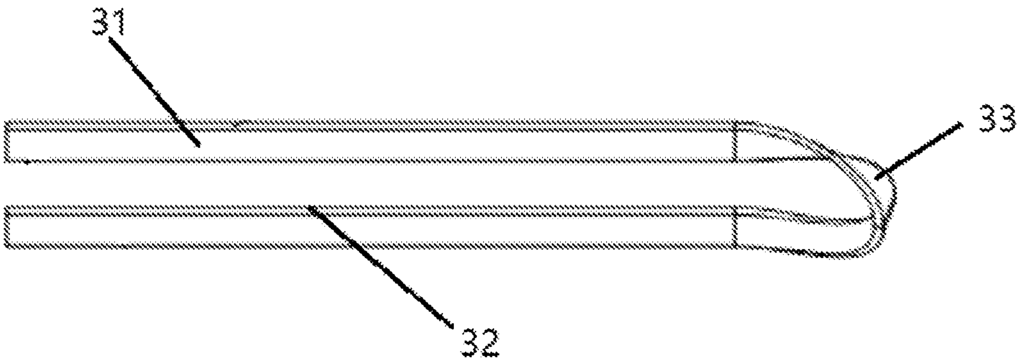
FIG. 8 is a perspective view of a heat exchange tube in a heat exchanger according to an embodiment of the present disclosure.
Figure 9:
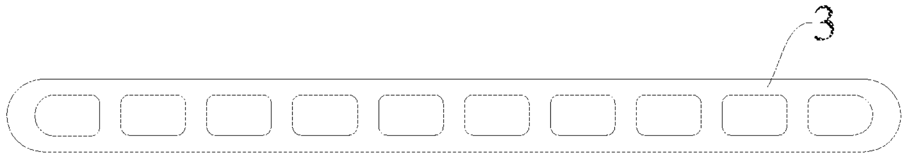
FIG. 9 is a sectional view of a heat exchange tube in a heat exchanger according to an embodiment of the present disclosure.
Figure 10:
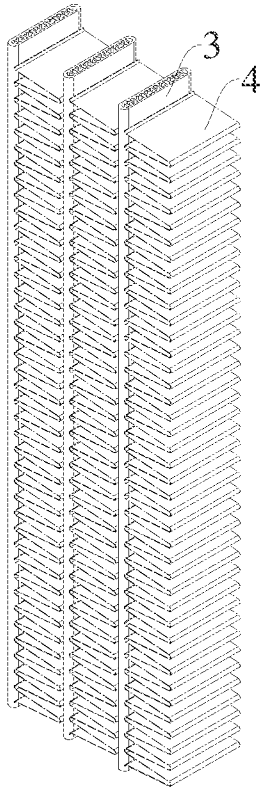
FIG. 10 is a partial perspective view of a fin in a heat exchanger according to an embodiment of the present disclosure.

In some other embodiments, as shown in FIGS. 3 and 7, a front end of the first arc-shaped section 3412 is connected to the first section 31, and a rear end of the first arc-shaped section 3412 is connected to the second section 32. In the plurality of heat exchange tubes 3, the plurality of sections 34 to be bent are translated by the same distance in the direction from right to left, so that the plurality of heat exchange tubes 3 have the consistent directions from the first faces of their respective first sections 31 to the first faces of their respective first arc-shaped sections 3412.

In some embodiments, the transition section 342 includes a second straight section 3421 at least in part, and a length direction of the second straight section 3421 and the length direction of the first section 31 define an included angle therebetween. Or, the transition section 342 includes a second arc-shaped section 3422 at least in part.

As shown in FIGS. 4, 5 and 6, the first section 31 and the second section 32 both extend in the front-rear direction, a front end of one second straight section 3421 is connected to the rear end of the first section 31, and a rear end of the one second straight section 3421 is inclined leftwards in a direction from front to rear. A rear end of another second straight section 3421 is connected to the front end of the second section 32, and a front end of the other second straight section 3421 extends from rear to front and is inclined leftwards.

In some other embodiments, as shown in FIGS. 3 and 7, the front end of the first arc-shaped section 3412 is connected to the first section 31 through a second arc-shaped section 3422, and the rear end of the first arc-shaped section 3412 is connected to the second section 32 through another second arc-shaped section 3422.

In some embodiments, the first fin 41 is a corrugated fin extending in the length direction of the first section 31 of the heat exchange tube 3, and/or the second fin 42 is a corrugated fin extending in the length direction of the second section 32 of the heat exchange tube. A density of the first fin 41 is different from a density of the second fin 42.

As shown in FIGS. 3 and 4, the first fin 41 includes a plurality of identical sub fins, and the plurality of identical sub fins are sequentially connected end to end to constitute the corrugated first fin 41. The first fin 41 is arranged between the adjacent first sections 31. The first fin 41 is configured to fix the two adjacent first sections 31 in the left-right direction, so as to stabilize the relative position between the adjacent first sections 31 and to improve the heat exchange performance of the heat exchanger.

The second fin 42 includes a plurality of identical sub fins, and the plurality of identical sub fins are sequentially connected end to end to constitute the corrugated second fin 42. The second fin 42 is arranged between the adjacent second sections 32. The second fin 42 is configured to fix the two adjacent second sections 32 in the left-right direction, so as to stabilize the relative position between the adjacent second sections 32 and to improve the heat exchange performance of the heat exchanger.

A density, a number of windows and an angle of the window of the plurality of sub fins in the first fin 41 may be the same with or different from a density, a number of windows and an angle of the window of the plurality of sub fins in the second fin 42. The fin 4 may increase the heat exchange area between adjacent heat exchange tubes 3 and improve the heat exchange efficiency of the heat exchanger.

In some embodiments, the first fin 41 is an insert fin extending in a thickness direction of the first section 31 of the heat exchange tube 3, and/or the second fin 42 is an insert fin extending in a thickness direction of the second section 32 of the heat exchange tube 3.

Some specific exemplary heat exchangers according to the present disclosure are described below with reference to FIGS. 1 to 5 and 8.

As shown in FIGS. 1 to 5 and 8, the heat exchanger according to the embodiments of the present disclosure includes a first header 1, a second header 2, a plurality of heat exchange tubes 3 and a fin 4.

The first header 1 and the second header 2 are juxtaposed in the front-rear direction and extend in the left-right direction, and a length of the first header 1 is the same with a length of the second header 2.

The plurality of heat exchange tubes 3 are arranged between the first header 1 and the second header 2 and spaced apart in the left-right direction.

The heat exchange tube 3 includes a first section 31, a bent section 33, and a second section 32. A lower end of the first section 31 is connected to a first end of the bent section 33, an upper end of the first section 31 is in communication with the first header 1, a lower end of the second section 32 of the heat exchange tube 3 is connected to a second end of the bent section 33, and an upper end of the second section 32 is in communication with the second header 2. A length direction of the first section 31 and a length direction of the second section 32 define an included angle therebetween, and adjacent bent sections 33 in the left-right direction are spaced apart.

The bent section 33 includes a section 34 to be bent before bending, and the section 34 to be bent includes a protruding section 341 and at least two transition sections 342. A front end of the protruding section 341 is connected to a rear end of one transition section 342, and a front end of the one transition section 342 is connected to a rear end of the first section 31. A rear end of the protruding section 341 is connected to a front end of another transition section 342, and a rear end of the other transition section 342 is connected to a front end of the second section 32.

The heat exchange tube 3 is flat, the heat exchange tube 3 includes a left side face and a right side face arranged in the left-right direction, the heat exchange tube 3 includes a front side face and a rear side face arranged in the front-rear direction, and an intersection portion of the left side face and the front side face is a first side edge. A plane parallel to the page of FIG. 4 is defined as a first plane before the bent section 33 is bent. In the first plane, a projection line of the first side edge of the protruding section 341 of the heat exchange tube 3 is not collinear with a projection line of the first side edge of the first section 31 of the heat exchange tube 3. A minimum distance from the projection line of the first side edge of the protruding section 341 of the heat exchange tube 3 to the projection line of the first side edge of the first section 31 of the heat exchange tube 3 is H, a minimum distance from the projection line of the first side edge of the first section 31 of the heat exchange tube 3 to the projection line of the first side edge of the first section 31 of another adjacent heat exchange tube 3 in the length direction of the first header 1 is L, and H is greater than or equal to L. The protruding section 341 includes a first straight section 3411. The first straight section 3411 extends in the front-rear direction, the first section 31 extends in the front-rear direction, and a length direction of the first straight section 3411 is generally parallel to the length direction of the first section 31.

The transition section 342 includes a second straight section 3421. The first section 31 and the second section 32 both extend in the front-rear direction. A front end of one second straight section 3421 is connected to the rear end of the first section 31, and a rear end of the one second straight section 3421 extends from front to rear and is inclined leftwards. A rear end of another second straight section 3421 is connected to the front end of the second section 32, and a front end of the other second straight section 3421 extends from rear to front and is inclined leftwards.

The fin 4 includes a first fin 41 and a second fin 42.

The first fin 41 includes a plurality of identical sub fins, and the plurality of identical sub fins are sequentially connected end to end to constitute a corrugated first fin 41. The first fin 41 is arranged between adjacent first sections 31, and the first fin 41 is configured to fix the two adjacent first sections 31.

The second fin 42 includes a plurality of identical sub fins, and the plurality of identical sub fins are sequentially connected end to end to constitute a corrugated second fin 42. The second fin 42 is arranged between adjacent second sections 32, and the second fin 42 is configured to fix the two adjacent second sections 32.

Other exemplary heat exchangers according to the present disclosure are described below with reference to FIGS. 1 and 6.

As shown in FIGS. 1 and 6, the heat exchanger includes the first header 1, the second header 2, the plurality of heat exchange tubes 3 and the fin 4.

The protruding section 341 includes a first arc-shaped section 3412, and the transition section 342 includes two second straight sections 3421.

A front end of the first arc-shaped section 3412 is connected to a rear end of one second straight section 3421, and a front end of the one second straight section 3421 is connected to the rear end of the first section 31. A rear end of the first arc-shaped section 3412 is connected to a front end of another second straight section 3421, and a rear end of the other second straight section 3421 is connected to the front end of the second section 32.

Other structures of the heat exchanger shown in FIGS. 1 and 6 may be the same with the structures in the embodiments shown in FIGS. 2 to 5 and 8, and will not be described in detail here.

Further exemplary heat exchangers according to the present disclosure are described below with reference to FIGS. 1 and 7.

As shown in FIGS. 1 and 7, the heat exchanger includes the first header 1, the second header 2, the plurality of heat exchange tubes 3 and the fin 4.

The protruding section 341 includes a first arc-shaped section 3412, and the transition section 342 includes two second arc-shaped sections 3422.

A front end of the first arc-shaped section 3412 is connected to a rear end of one second arc-shaped section 3422, and a front end of the one second arc-shaped section 3422 is connected to the rear end of the first section 31. A rear end of the first arc-shaped section 3412 is connected to a front end of another second arc-shaped section 3422, and a rear end of the other second arc-shaped section 3422 is connected to the front end of the second section 32.

Other structures of the heat exchanger shown in FIGS. 1 and 7 may be the same with the structures in the embodiments shown in FIGS. 2 to 5 and 8, and will not be described in detail here.

As shown in FIGS. 11 to 18, a method for processing a heat exchanger according to an embodiment of the present disclosure includes following steps.

Figure 11:
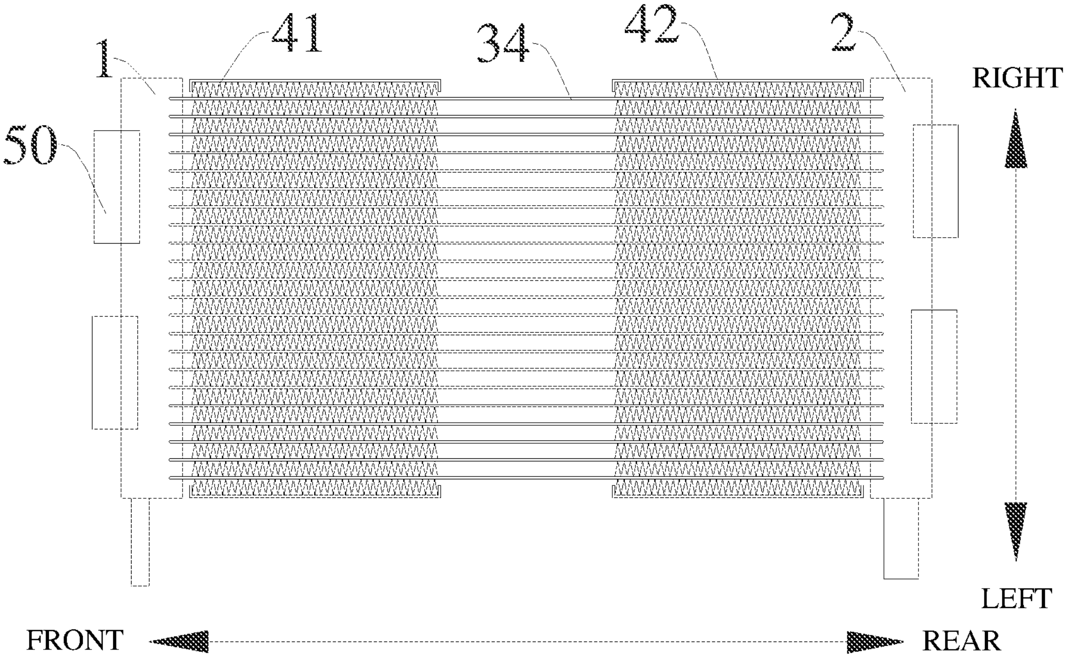
FIG. 11 is a schematic view illustrating fixing a heat exchanger before bending in a method for processing a heat exchanger according to an embodiment of the present disclosure.

A heat exchanger to be processed is prepared. The heat exchanger to be processed includes a first header 1, a second header 2, a plurality of heat exchange tubes 3 and a fin 4. The plurality of heat exchange tubes 3 are spaced apart along a length direction of the first header 1 (a left-right direction as shown in FIG. 11), and the heat exchange tube 3 communicates the first header 1 with the second header 2. The heat exchange tube 3 includes a first face (a left side face of the heat exchange tube 3 in FIG. 11) and a second face (a right side face of the heat exchange tube 3 in FIG. 11) arranged in parallel in the length direction of the first header 1.

The heat exchange tube 3 includes a first section 31, a section 34 to be bent, and a second section 32. A first end of the first section 31 (a rear end of the first section 31 as shown in FIG. 11) is connected to a first end of the section 34 to be bent (a front end of the section 34 to be bent as shown in FIG. 11), and a second end of the first section 31 (a front end of the first section 31 as shown in FIG. 11) is in communication with the first header 1. A first end of the second section 32 (a front end of the second section 32 as shown in FIG. 11) is connected to a second end of the section 34 to be bent (a rear end of the section 34 to be bent as shown in FIG. 11), and a second end of the second section 32 (a rear end of the second section 32 as shown in FIG. 11) is in communication with the second header 2.

The fin 4 includes a first fin 41 and a second fin 42. The first fin 41 is arranged between adjacent first sections 31 in the length direction of the first header 1, the second fin 42 is arranged between adjacent second sections 32 in the length direction of the first header 1, and no fin is arranged between adjacent sections 34 to be bent in the length direction of the first header 1.

A part of the section 34 to be bent of the heat exchange tube 3 is translated by a preset distance relative to the first section 31 and the second section 32 of the heat exchange tube 3 along the length direction of the first header 1, so that the translated part of the section 34 to be bent deviates from the first section 31 of the heat exchange tube 3 in the length direction of the first header 1.

The first header 1 is moved towards the second header 2, and the second header 2 is moved towards the first header 1.

After the part of the section 34 to be bent is translated by the preset distance, the section 34 to be bent of the heat exchange tube 3 is bent in the length direction, while an included angle between the first section 31 and the second section 32 of the heat exchange tube 3 is reduced to a predetermined angle.

Figure 12:
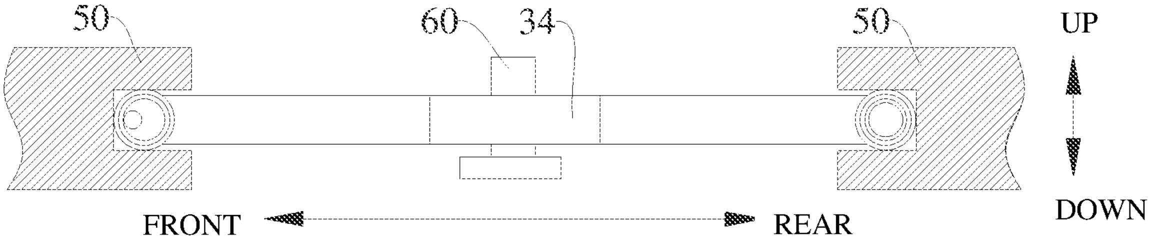
FIG. 12 is a schematic view illustrating translating a section to be bent in a method for processing a heat exchanger according to an embodiment of the present disclosure.

As shown in FIGS. 11 and 12, the heat exchanger to be processed is prepared, and the first header 1 and the second header 2 may be fixed by a clamping device 50. Specifically, at least two clamping devices 50 are provided, and the at least two clamping devices 50 are arranged on the first header 1 and the second header 2 and fix the heat exchanger to be processed on a workbench, so as to limit the movement of the heat exchanger in the length direction of the first header 1. In some embodiments, the heat exchanger to be processed may not be fixed, or the clamping device may not be used, which is conducive to the movement of the heat exchanger in the subsequent bending process.

In some embodiments, the part of at least one of the plurality of sections 34 to be bent is sequentially translated by the preset distance relative to the first section 31 and the second section 32 along the length direction of the first header 1, or the parts of the plurality of sections 34 to be bent are simultaneously translated by the preset distance relative to the first section 31 and the second section 32 along the length direction of the first header 1. The preset distance is greater than or equal to a spacing between adjacent first sections 31 in the length direction of the first header 1.

Figure 13:
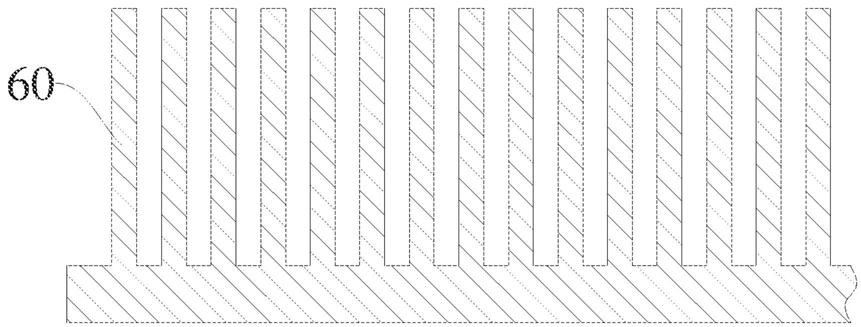
FIG. 13 is a schematic view of a pushing device in FIG. 12.
Figure 14:
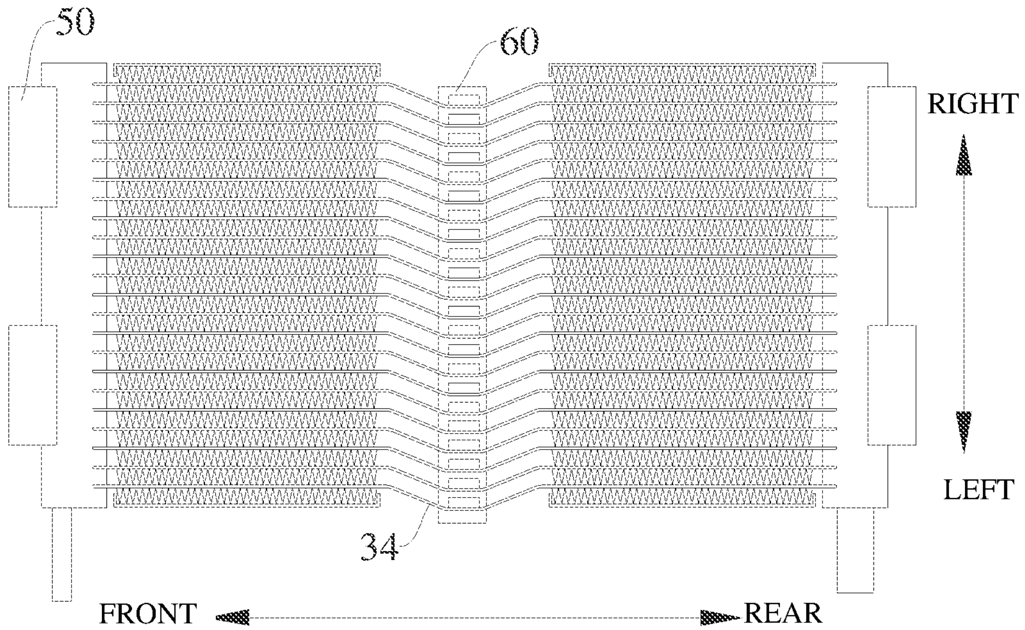
FIG. 14 is a schematic view illustrating that a section to be bent has been translated in a method for processing a heat exchanger according to an embodiment of the present disclosure.

In some embodiments, the translation of the plurality of heat exchange tubes may be achieved by using a device. As shown in FIGS. 12 to 14, a pushing device 60 is inserted between adjacent sections 34 to be bent in the length direction of the first header 1 after the heat exchanger to be processed is fixed. The pushing device 60 is moved horizontally in the left-right direction, so that the part of the section 34 to be bent is moved horizontally by the preset distance relative to the first section 31 and the second section 32.

When the section 34 to be bent is pushed by the pushing device 60, in order to reduce a pushing force on the section 34 to be bent and prevent the irregular deformation of the section 34 to be bent, the pushing device 60 may sequentially push a single section 34 to be bent step by step, or may sequentially push a plurality of groups of sections 34 to be bent of the plurality of sections 34 to be bent step by step. Each group of sections 34 to be bent includes at least two sections 34 to be bent.

In some specific embodiments, a midpoint of the section 34 to be bent in the length direction is determined, and the midpoint of the section 34 to be bent is horizontally translated leftwards along the left-right direction, so as to obtain a first arc-shaped section 3412, an second straight section 3421 at a front end of the first arc-shaped section 3412, and another second straight section 3421 at a rear end of the first arc-shaped section 3412. Peripheral contours of cross sections of the first arc-shaped section 3412 and the two second straight sections 3421 approximately form a V shape or a U shape.

In some other specific embodiments, near the midpoint of the section 34 to be bent, the midpoint of the section 34 to be bent is horizontally translated leftwards along the left-right direction, so as to obtain a first arc-shaped section 3412, a second arc-shaped section 3422 at a front end of the first arc-shaped section 3412, and another second arc-shaped section 3422 at a rear end of the first arc-shaped section 3412. It can be understood that other portions of the section 34 to be bent may also be translated, so as to obtain the first arc-shaped section 3412 and the second arc-shaped section 3422.

In some embodiments, the section 34 to be bent is twisted relative to the first section 31 and the second section 32 of the heat exchange tube 3 along the length direction of the first header 1 before the section 34 to be bent of the heat exchange tube 3 is bent, so that an included angle between a first face of the section 34 to be bent of the heat exchange tube 3 and a first face of the first section 31 of the heat exchange tube 3 is greater than 0 degrees and less than or equal to 90 degrees.

Figure 15:
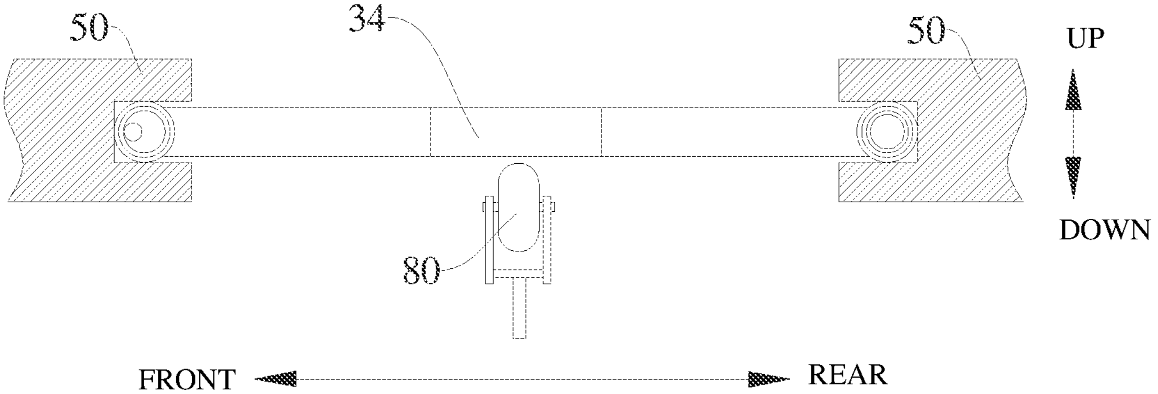
FIG. 15 is a schematic view illustrating twisting a section to be bent in a method for processing a heat exchanger according to an embodiment of the present disclosure.
Figure 16:
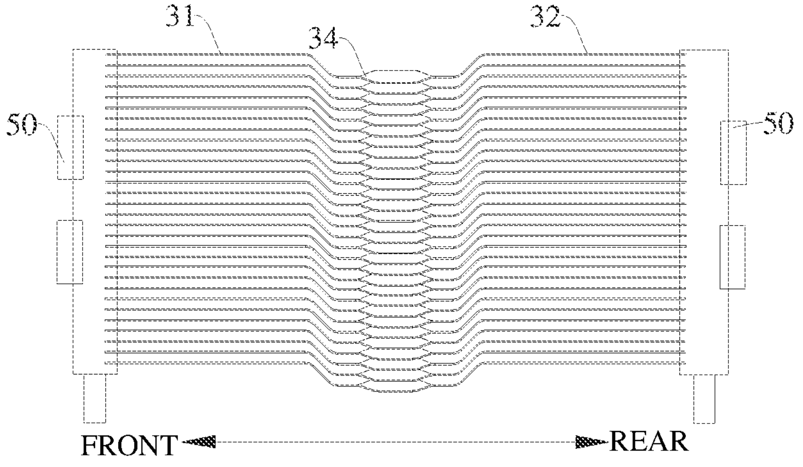
FIG. 16 is a schematic view illustrating a heat exchanger after twisting a section to be bent in a method for processing a heat exchanger according to an embodiment of the present disclosure.

As shown in FIGS. 15 and 16, the part of the section 34 to be bent is twisted after the part of the section 34 to be bent is moved horizontally by the preset distance.

A torsion position of the section 34 to be bent is determined, a torsion member 80 is placed below the torsion position and adjacent to lower surfaces of the plurality of sections 34 to be bent. Then, the torsion member 80 sequentially comes into contact with partial surfaces of the plurality of sections 34 to be bent along the length direction of the first header 1 (the left-right direction as shown in FIG. 11), so as to twist the section 34 to be bent by a certain angle, so that the section 34 to be bent of the heat exchange tube 3 is inclined relative to the first section 31 and the second section 32, and thus the included angle between the first face of the section 34 to be bent of the heat exchange tube 3 and the first face of the first section 31 of the heat exchange tube 3 is greater than 0 degrees and less than or equal to 90 degrees.

In some embodiments, a mandrel 70 is placed on the section 34 to be bent and abuts against the part of the section 34 to be bent when the section 34 to be bent of the heat exchange tube 3 is bent. It can be understood that the mandrel allows the deformation of the heat exchange tube at the section to be bent to be controlled, but the bending may be realized without the mandrel 70.

Figure 17:
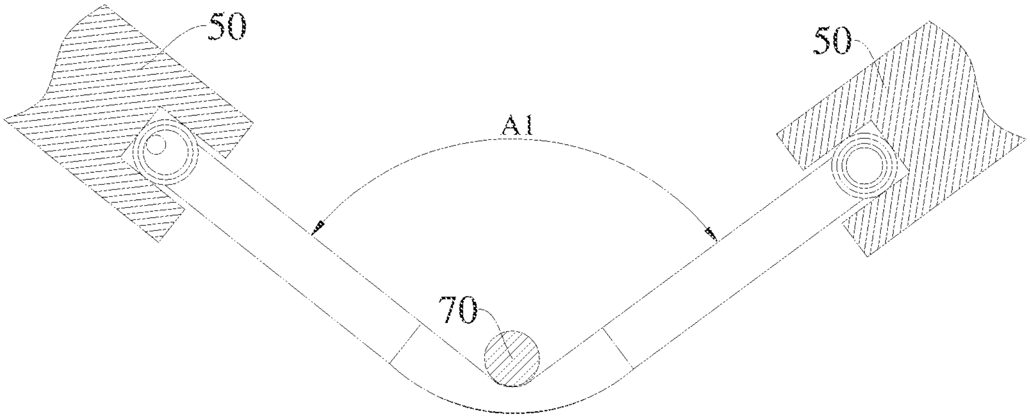
FIG. 17 is a schematic view illustrating bending a heat exchange tube to a predetermined angle A1 in a method for processing a heat exchanger according to an embodiment of the present disclosure.

As shown in FIG. 17, the torsion position of the section 34 to be bent is located, and the mandrel 70 is placed above the torsion position and abuts against upper surfaces of the plurality of sections 34 to be bent. The first header 1 and the second header 2 on two sides are moved upward simultaneously, so as to reduce the included angle between the first section 31 and the second section 32, so that the part of the section 34 to be bent moves close to a peripheral surface of the mandrel 70.

In some embodiments, when the section 34 to be bent of the heat exchange tube is bent, the mandrel is placed on the section 34 to be bent, the heat exchange tube at the section 34 to be bent is not twisted, and the mandrel 70 abuts against a surface of the part of the section 34 to be bent in its width direction. The first header 1 and the second header 2 on two sides are moved upward simultaneously, so as to reduce the included angle between the first section 31 and the second section 32, so that the part of the section 34 to be bent moves close to the circumferential surface of the mandrel 70.

In some embodiments, the step of bending the section 34 to be bent of the heat exchange tube 3 includes following sub steps: the section 34 to be bent of the heat exchange tube 3 is bent, so as to bend the angle between the length direction of the first section 31 and the length direction of the second section 32 to a preset angle A1; the mandrel 70 is pulled out and the section 34 to be bent of the heat exchange tube 3 continues to be bent, so as to bend the angle between the length direction of the first section 31 and the length direction of the second section 32 to a target angle A2, in which A2≥0°, and A2 is less than A1.

In some other embodiments, the heat exchange tube at the section 34 to be bent may be pushed to be inclined leftwards as a whole or partially after the mandrel is pulled out, and then the section 34 to be bent of the heat exchange tube 3 continues to be further bent, so as to bend the angle between the length direction of the first section 31 and the length direction of the second section 32 to the target angle A2, in which A2≥0°, and A2 is less than A1.

As shown in FIG. 17, the clamping devices 50 are moved upward synchronously, so as to bend the section 34 to be bent of the heat exchange tube 3, so that the first section 31 and the second section 32 move close to each other, and the included angle between the length direction of the first section 31 and the length direction of the second section 32 is A1. Specifically, a range of A1 may be: 60°≤A1≤135°.

Figure 18:
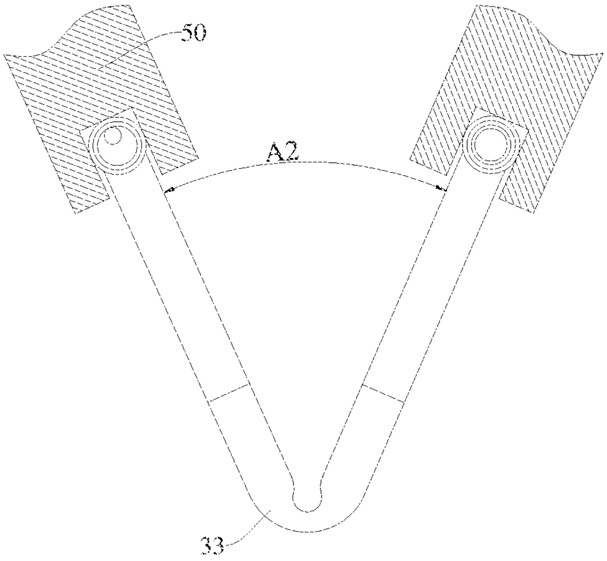
FIG. 18 is a schematic view illustrating bending a heat exchange tube to a predetermined angle A2 in a method for processing a heat exchanger according to an embodiment of the present disclosure.

As shown in FIG. 18, the mandrel 70 is first pulled out, and then the clamping devices 50 continue to be moved upward, so as to further bend the section 34 to be bent of the heat exchange tube 3, so that the first section 31 and the second section 32 move further close to each other, and the included angle between the length direction of the first section 31 and the length direction of the second section 32 is A2. Specifically, A2≥0°, and A2 is less than A1.

As shown in FIGS. 19 to 24, a method for processing a heat exchanger according to another embodiment of the present disclosure includes following steps.

Figure 19:
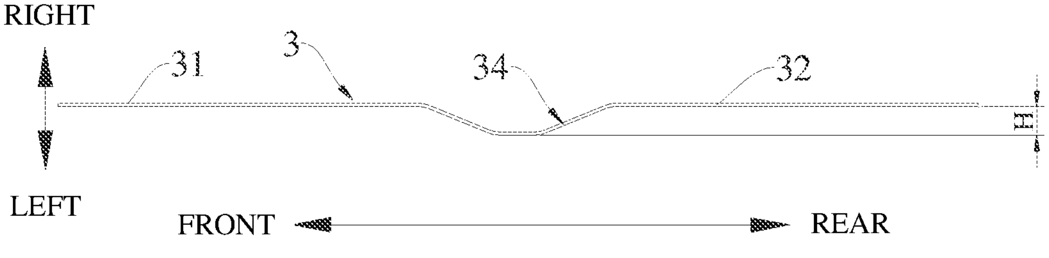
FIG. 19 is a schematic view illustrating that a section to be bent of a heat exchange tube has been translated in a method for processing a heat exchanger according to another embodiment of the present disclosure.

A section of a heat exchange tube 3 is translated by a preset distance along a thickness direction of the heat exchange tube 3 (a left-right direction as shown in FIG. 19) relative to a first end (a front end of the heat exchange tube 3 in FIG. 19) and a second end (a rear end of the heat exchange tube 3 in FIG. 19) of the heat exchange tube 3, so that the translated sections of the heat exchange tube 3 protrudes beyond the first end and the second end of the heat exchange tube 3 in the thickness direction of the heat exchange tube 3. As shown in FIG. 19, a middle section of the heat exchange tube 3 is translated from right to left by a distance of H.

The plurality of heat exchange tubes 3 are arranged and spaced apart along the thickness direction of the heat exchange tube 3, and its two ends in the length direction are mounted to and fitted with the first header 1 and the second header 2, respectively, and directions, in which the sections of the plurality of heat exchange tubes 3 protrude from their first ends and second ends in the thickness direction of the heat exchange tube 3, are identical. The first ends of the plurality of heat exchange tubes 3 (the front ends of the heat exchange tubes 3 in FIG. 20) are fixedly connected to a first header 1, and the second ends of the plurality of heat exchange tubes 3 (the rear ends of the heat exchange tubes 3 in FIG. 20) are fixedly connected to a second header 2. The protruding sections of the plurality of heat exchange tubes 3 are aligned in a length direction of the first header 1 (i.e., in the thickness direction of the heat exchange tube 3).

Figure 20:
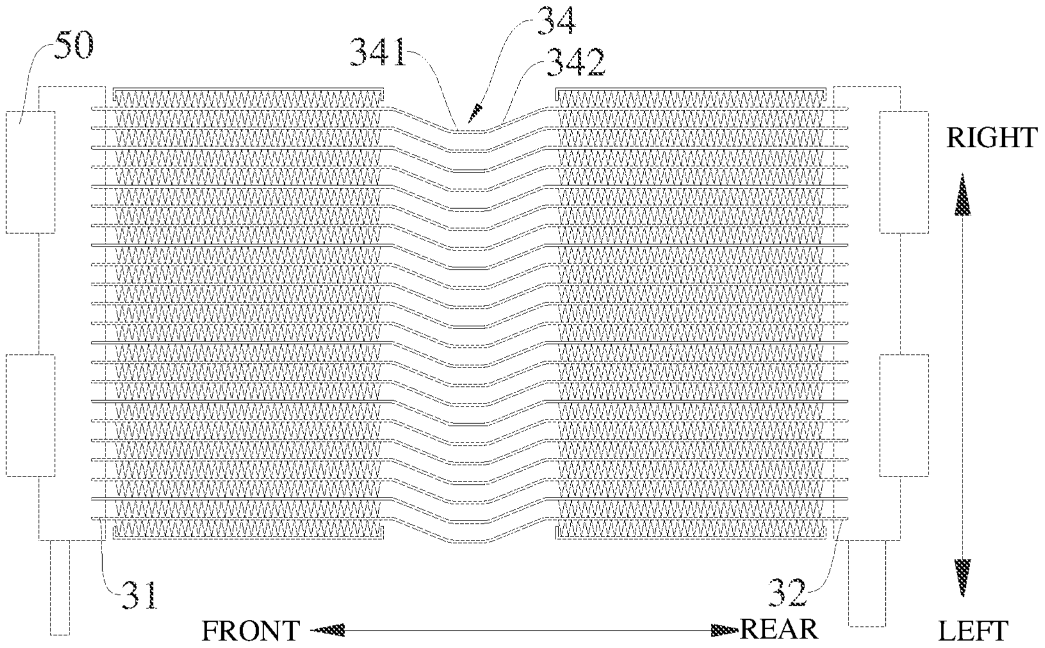
FIG. 20 is a schematic view illustrating mounting a heat exchange tube on a first header and a second header after translating a section to be bent in a method for processing a heat exchanger according to another embodiment of the present disclosure.

As shown in FIG. 20, the plurality of heat exchange tubes 3 shown in FIG. 19 are spaced apart and arranged between the first header 1 and the second header 2, and each of the protruding sections of the plurality of heat exchange tubes 3 protrudes from right to left. In some embodiments, the plurality of heat exchange tubes 3 have a consistent spacing therebetween.

In the thickness direction of the heat exchange tube 3, a first fin 41 and a second fin 42 are arranged between adjacent heat exchange tubes 3, and no fin is arranged between the protruding sections of the adjacent heat exchange tubes 3.

A section of the heat exchange tube 3 connected to the first fin 41 is a first section 31, a section of the heat exchange tube 3 connected to the second fin 42 is a second section 32, and a section of the heat exchange tube 3, which is not connected to the first fin 41 and the second fin 42, is a section 34 to be bent.

In some embodiments, the method for processing the heat exchanger further includes following steps: the heat exchange tube 3 is fixedly connected with the first header 1; the heat exchange tube 3 is fixedly connected with the second header 2; the heat exchange tube 3 is fixedly connected with the first fin 41; the heat exchange tube 3 is fixedly connected with the second fin 42.

As shown in FIG. 19, the plurality of heat exchange tubes 3 extend in the left-right direction, the left end of the heat exchange tube 3 is fixedly connected to the first header 1, the right end of the heat exchange tube 3 is fixedly connected to the second header 2, and the plurality of heat exchange tubes 3 are uniformly arranged along the left-right direction. The first fin 41 is arranged between the first sections 31 of the adjacent heat exchange tubes 3, and the second fin 42 is arranged between the second sections 32 of the adjacent heat exchange tubes 3.

In some embodiments, the method for processing the heat exchanger further includes following steps: the section 34 to be bent of the heat exchange tube 3 is bent in the length direction, while the included angle between the first section 31 and the second section 32 of the heat exchange tube is reduced to a predetermined angle.

Figure 23:
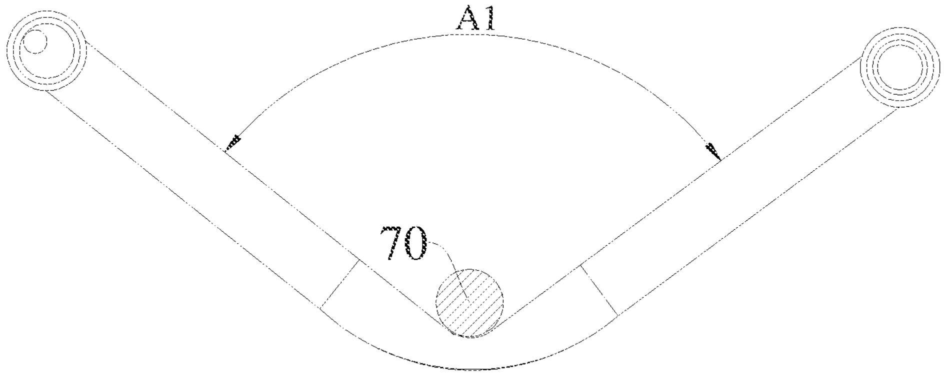
FIG. 23 is a schematic view illustrating bending a heat exchange tube to a predetermined angle A1 in a method for processing a heat exchanger according to another embodiment of the present disclosure.
Figure 24:
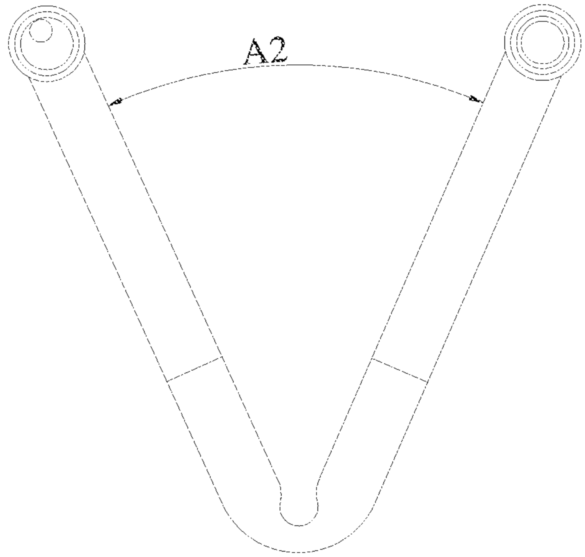
FIG. 24 is a schematic view illustrating bending a heat exchange tube to a predetermined angle A2 in a method for processing a heat exchanger according to another embodiment of the present disclosure.

As shown in FIGS. 23 and 24, the first header 1 and the second header 2 are moved upward so that the section 34 to be bent is bent, while the included angle between the first section 31 and the second section 32 of the heat exchange tube is reduced to the predetermined angle.

In some embodiments, the heat exchange tube 3 includes a first face (a left side face of the heat exchange tube 3 in FIG. 20) and a second face (a right side face of the heat exchange tube 3 in FIG. 20) arranged in parallel in the length direction of the first header 1. Before the section 34 to be bent of the heat exchange tube 3 is bent, the protruding section is twisted relative to the first section 31 and the second section 32 of the heat exchange tube 3 along the length direction of the first header 1, so that an included angle between a first face of the protruding section and a first face of the first section 31 is greater than 0 degrees and less than or equal to 90 degrees.

Figure 21:
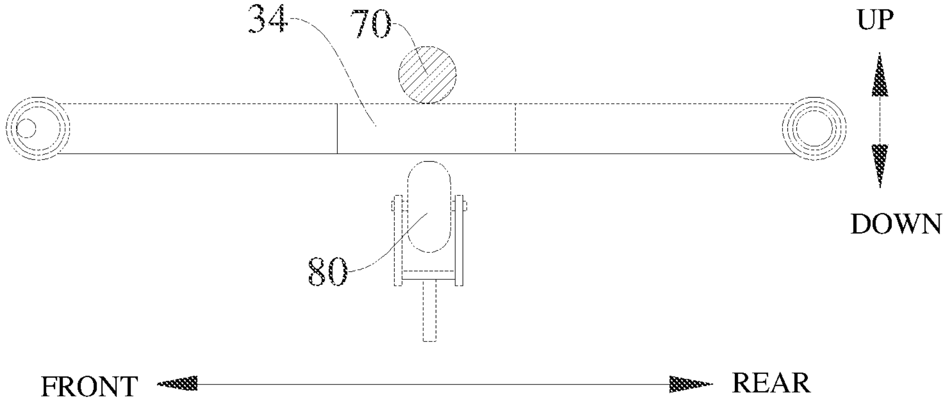
FIG. 21 is a schematic view illustrating twisting a section to be bent in a method for processing a heat exchanger according to another embodiment of the present disclosure.
Figure 22:
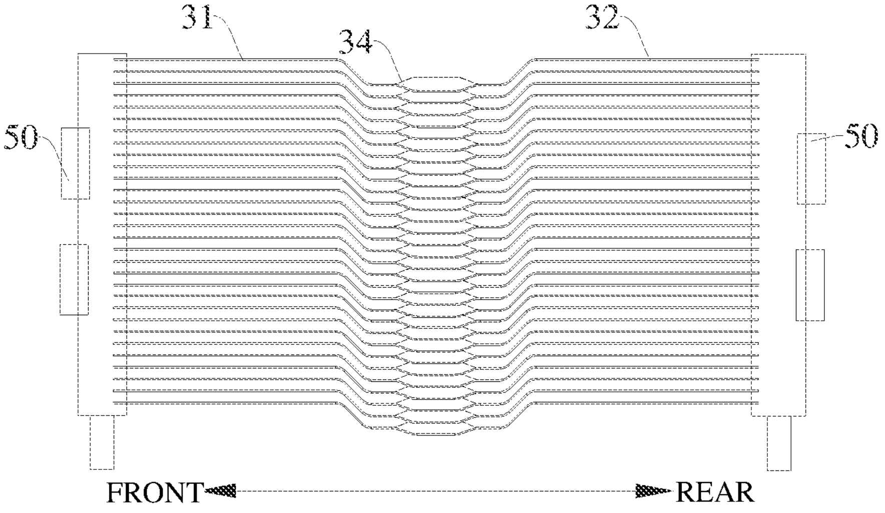
FIG. 22 is a schematic view illustrating a heat exchanger after twisting a section to be bent in a method for processing a heat exchanger according to another embodiment of the present disclosure.

As shown in FIGS. 21 and 22, the part of the section 34 to be bent is twisted after the part of the section 34 to be bent is moved horizontally by the preset distance. Specifically, a torsion position of the section 34 to be bent is determined, a torsion member 80 is placed below the center of the torsion position and abuts against lower surfaces of the plurality of sections 34 to be bent. Then, the torsion member 80 is rolled over the plurality of sections 34 to be bent along the length direction of the first header 1 (the left-right direction as shown in FIG. 20), so as to twist the sections 34 to be bent to a certain angle, so that the section 34 to be bent of the heat exchange tube 3 is inclined relative to the first section 31 and the second section 32, and thus the included angle between a first face of the section 34 to be bent of the heat exchange tube 3 and the first face of the first section 31 of the heat exchange tube 3 is greater than 0 degrees and less than or equal to 90 degrees.

In some embodiments, the mandrel 70 is placed on the protruding section and abuts against the protruding section when the protruding section of the heat exchange tube 3 is bent. The protruding section of the heat exchange tube 3 is bent, so as to bend an angle between the length direction of the first section 31 and the length direction of the second section 32 to a preset angle A1. The mandrel 70 is pulled out. The protruding section of the heat exchange tube 3 continues to be bent, so as to bend the angle between the length direction of the first section 31 and the length direction of the second section 32 to a target angle A2, in which A2≥0°, and A2 is less than A1.

As shown in FIG. 23, the torsion position of the section 34 to be bent is determined, and the mandrel 70 is placed above the torsion position and abuts against upper surfaces of the plurality of sections 34 to be bent. The first header 1 and the second header 2 on two sides of the section 34 to be bent are moved upward simultaneously, so that the part of the section 34 to be bent moves close to a peripheral surface of the mandrel 70.

As shown in FIG. 23, the first header 1 and the second header 2 are synchronously moved upward, so as to bend the section 34 to be bent of the heat exchange tube 3, so that the first section 31 and the second section 32 move close to each other, and the included angle between the length direction of the first section 31 and the length direction of the second section 32 is A1. Specifically, a range of A1 may be: 60°≤A1≤135°.

As shown in FIG. 24, the mandrel 70 is first pulled out, and then the first header 1 and the second header 2 continue to be moved upward, so as to further bend the section 34 to be bent of the heat exchange tube 3, so that the first section 31 and the second section 32 come further close to each other, and the included angle between the length direction of the first section 31 and the length direction of the second section 32 is A2. Specifically, A2≥0°, and A2 is less than A1.

In some embodiments, when the section 34 to be bent is bent, it is not necessary to simultaneously move the first header 1 and the second header 2, regardless of whether the first section 31 and the second section 32 are bent to the angle of A1 or A2. The first header 1 and the first section 31 may be fixed, and the second header 2 and the second section 32 may come close to the first header 1 and the first section 31 by being moved upward, so as to realize the predetermined angle between the first section 31 and the second section 32.

It should be noted that the above steps of the method may be performed in different sequences, that is, the sequence of the above steps of the method is not limited in the present disclosure. For example, the heat exchange tube 3 may be assembled with the first header 1, the second header 2 and the fins 41, 42, after the corresponding section of the heat exchange tube 3 is translated, twisted and bent.

In the description of the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

In the description of the present disclosure, terms "first" and "second" are only used for descriptive purposes and cannot be understood as indicating or implying relative importance. In the description of the present disclosure, "a plurality of" means at least two such as two or three, unless otherwise expressly and specifically defined.

In the present disclosure, unless otherwise expressly defined, terms such as "mounting," "interconnection," "connection," "fixing" shall be understood broadly, and may be, for example, fixed connections, detachable connections, or integral connections; may also be mechanical or electrical connections or intercommunication; may also be direct connections or indirect connections via intervening media;

may also be inner communications or interactions of two elements. For those skilled in the art, the specific meaning of the above terms in the present disclosure can be understood according to the specific situations.

In the present disclosure, unless otherwise expressly defined and specified, a structure in which a first feature is "on" or "below" a second feature may include an embodiment in which the first feature is in direct contact with the second feature, or may further include an embodiment in which the first feature and the second feature are in indirect contact through intermediate media. Furthermore, a first feature "on," "above," or "on top of" a second feature may include an embodiment in which the first feature is right or obliquely "on," "above," or "on top of" the second feature, or just means that the first feature is at a height higher than that of the second feature, while a first feature "below," "under," or "on bottom of" a second feature may include an embodiment in which the first feature is right or obliquely "below," "under," or "on bottom of" the second feature, or just means that the first feature is at a height lower than that of the second feature.

Although the embodiments of the present disclosure have been shown and described above, it can be understood that the above embodiments are exemplary and shall not be understood as limitation to the present disclosure, and changes, modifications, alternatives and variations can be made in the above embodiments within the scope of the present disclosure by those skilled in the art.

The invention claimed is:

1. A heat exchanger, comprising:

a first header and a second header; and a plurality of heat exchange tubes spaced apart along a length direction of the first header, the heat exchange tube communicating the first header with the second header, the heat exchange tube being flat, the heat exchange tube comprising a first face and a second face arranged along a thickness direction of the heat exchange tube, the heat exchange tube comprising a third face and a fourth face arranged along a width direction of the heat exchange tube, an intersection portion of the first face and the third face being a first side edge, the heat exchange tube comprising a first section, a bent section and a second section, a first end of the first section of the heat exchange tube being connected to a first end of the bent section, a second end of the first section being in communication with the first header, a first end of the second section of the heat exchange tube being connected to a second end of the bent section, a second end of the second section being in communication with the second header, a length direction of the first section and a length direction of the second section define an included angle therebetween, and adjacent bent sections in a thickness direction of the bent section being spaced apart;

wherein the bent section of the heat exchanger comprises a section to be bent before bending, the section to be bent comprises a protruding section and at least two transition sections, a first end of the protruding section is connected to a first end of one transition section, a second end of the one transition section is connected to the first end of the first section, a second end of the protruding section is connected to a first end of another transition section, and a second end of the other transition section is connected to the first end of the second section, wherein a plane parallel to the length direction of the first header and parallel to the length direction of the first section, and also perpendicular to a width direction of the first section is defined as a first plane before the bent section is bent; in the first plane, a projection line of a first side edge of the protruding section of the heat exchange tube is not collinear with a projection line of a first side edge of the first section of the heat exchange tube, a minimum distance from the projection line of the first side edge of the protruding section of the heat exchange tube to the projection line of the first side edge of the first section of the heat exchange tube is H, and a minimum distance from the projection line of the first side edge of the first section of the heat exchange tube to the projection line of the first side edge of the first section of another adjacent heat exchange tube in the length direction of the first header is L, and H is greater than or equal to L.

2. The heat exchanger according to claim 1, wherein H is less than 5 times Tw, in which Tw is a width of the heat exchange tube.

3. The heat exchanger according to claim 1, wherein H is greater than or equal to 1.5 times L.

4. The heat exchanger according to claim 1, wherein the protruding section comprises a first straight section at least in part before the bent section of the heat exchanger is bent, a length direction of the first straight section is generally parallel to the length direction of the first section, and the plurality of heat exchange tubes have consistent directions from first faces of their respective first sections to first faces of their respective first straight sections.

5. The heat exchanger according to claim 4, wherein the first straight section has a length of C before bending, the heat exchange tube has a length of A before the bent section of the heat exchange tube is bent, and C is less than or equal to 0.5 times A.

6. The heat exchanger according to claim 1, wherein, before the bent section of the heat exchanger is bent, the protruding section comprises a first arc-shaped section at least in part, and the plurality of heat exchange tubes have consistent directions from first faces of their respective first sections to first faces of their respective first arc-shaped sections.

7. The heat exchanger according to claim 4, wherein the transition section comprises a second straight section at least in part, and a length direction of the second straight section and the length direction of the first section define an included angle therebetween.

8. The heat exchanger according to claim 1, wherein the heat exchange further comprises a fin, the fin comprises a first fin and a second fin, the first fin is arranged between adjacent first sections in the length direction of the first header, the second fin is arranged between adjacent second sections in the length direction of the first header, and no fin is arranged between adjacent bent sections in the length direction of the first header, the first fin is a corrugated fin extending in the length direction of the first section of the heat exchange tube, and the second fin is a corrugated fin extending in the length direction of the second section of the heat exchange tube, and a density of the first fin is different from a density of the second fin.

9. The heat exchanger according to claim 1, wherein the heat exchange further comprises a fin, the fin comprises a first fin and a second fin, the first fin is arranged between adjacent first sections in the length direction of the first header, the second fin is arranged between adjacent second sections in the length direction of the first header, and no fin is arranged between adjacent bent sections in the length direction of the first header, the first fin is an insert fin extending in a thickness direction of the first section of the heat exchange tube, and the second fin is an insert fin extending in a thickness direction of the second section of the heat exchange tube.

10. A heat exchanger processing method comprising:

preparing a heat exchanger to be processed, wherein the heat exchanger to be processed comprises a first header, a second header, and a plurality of heat exchange tubes, the plurality of the heat exchange tubes are spaced apart along a length direction of the first header, the heat exchange tube communicates the first header with the second header, the heat exchange tube comprises a first face and a second face arranged in parallel in the length direction of the first header, the heat exchange tube comprises a first section, a section to be bent and a second section, a first end of the first section is connected to a first end of the section to be bent, a second end of the first section is in communication with the first header, a first end of the second section is connected to a second end of the section to be bent, and a second end of the second section is in communication with the second header;

translating a part of the section to be bent of the heat exchange tube by a preset distance relative to the first section and the second section of the heat exchange tube along the length direction of the first header, so that the translated part of the section to be bent deviates from the first section of the heat exchange tube in the length direction of the first header;

moving the first header towards the second header, and moving the second header towards the first header; and bending the section to be bent of the heat exchange tube in the length direction while reducing an included angle between the first section and the second section of the heat exchange tube to a predetermined angle, after translating the part of the section to be bent by the preset distance, wherein a mandrel is placed on the section to be bent and abuts against the part of the section to be bent, when the section to be bent of the heat exchange tube is bent.

11. The heat exchanger processing method according to claim 10, wherein the part of at least one of a plurality of sections to be bent is sequentially translated by the preset distance relative to the first section and the second section along the length direction of the first header, and the preset distance is greater than or equal to a spacing between adjacent first sections in the length direction of the first header.

12. The heat exchanger processing method according to claim 10, wherein before the section to be bent of the heat exchange tube is bent, the section to be bent is twisted relative to the first section and the second section of the heat exchange tube along the length direction of the first header, so that a included angle between a first face of the section to be bent of the heat exchange tube and a first face of the first section of the heat exchange tube is greater than 0 degrees and less than or equal to 90 degrees.

13. The heat exchanger processing method according to claim 10, wherein bending the section to be bent of the heat exchange tube comprises:

bending the section to be bent of the heat exchange tube, so as to bend an angle between a length direction of the first section and a length direction of the second section to a preset angle A1;

pulling out the mandrel; and continuing to bend the section to be bent of the heat exchange tube, so as to bend the angle between the length direction of the first section and the length direction of the second section to a target angle A2, wherein A2≥0°, and A2 is less than A1.

14. The heat exchanger processing method according to claim 10, wherein the parts of a plurality of sections to be bent are simultaneously translated by the preset distance relative to the first section and the second section along the length direction of the first header, and the preset distance is greater than or equal to a spacing between adjacent first sections in the length direction of the first header.

15. A method for processing a heat exchanger, comprising:

translating a section of a heat exchange tube by a preset distance relative to a first end and a second end of the heat exchange tube along a thickness direction of the heat exchange tube, so that the translated section of the heat exchange tube protrudes from the first end and the second end of the heat exchange tube in the thickness direction of the heat exchange tube;

arranging and spacing apart a plurality of the heat exchange tubes along the thickness direction of the heat exchange tube, wherein directions, in which the sections of the plurality of the heat exchange tubes protrude from their first ends and their second ends in the thickness direction of the heat exchange tube, are identical;

fixedly connecting first ends of the plurality of the heat exchange tubes with a first header and fixedly connecting second ends of the plurality of the heat exchange tubes with a second header, wherein the protruding sections of the plurality of the heat exchange tubes are aligned in a length direction of the first header; and bending the section to be bent of the heat exchange tube in the length direction while reducing an included angle between the first section and the second section of the heat exchange tube to a predetermined angle, wherein:

the heat exchange tube comprises a first face and a second face arranged in parallel in the length direction of the first header; and before bending the section to be bent, the protruding section is twisted relative to the first section and second section of the heat exchange tube along the length direction of the first header, so that an included angle between a first face of the protruding section and a first face of the first section is greater than 0 degrees and less than or equal to 90 degrees.

16. The method for processing the heat exchanger according to claim 15, further comprising: fixedly connecting the heat exchange tube with the first header; and fixedly connecting the heat exchange tube with the second header.

17. The method for processing the heat exchanger according to claim 15, wherein a mandrel is placed on the protruding section and abuts against the protruding section, when the protruding section of the heat exchange tube is bent;

the protruding section of the heat exchange tube is bent, so as to bend an angle between a length direction of the first section and a length direction of the second section to a preset angle A1;

the mandrel is pulled out; and the protruding section of the heat exchange tube continues to be bent, so as to bend the angle between the length direction of the first section and the length direction of the second section to a target angle A2, wherein $A2 \geq 0°$, and A2 is less than A1.

* * * * *